United States Patent
Shenoi

(10) Patent No.: US 7,130,332 B1
(45) Date of Patent: Oct. 31, 2006

(54) PILOT TRACKING FOR SYNCHRONIZATION USING CORRELATION BETWEEN DIGITAL SIGNAL AND LOCALLY GENERATED VERSION OF PN SIGNAL

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 0 days.

(21) Appl. No.: 09/553,735

(22) Filed: Apr. 20, 2000

Related U.S. Application Data

(60) Provisional application No. 60/130,088, filed on Apr. 20, 1999.

(51) Int. Cl.
   *H04B 1/69* (2006.01)
(52) U.S. Cl. .................................................. 375/150
(58) Field of Classification Search ............... 375/137, 375/134, 136, 142, 150, 259, 149, 206, 208, 375/209, 210, 359, 365, 367, 144, 147; 370/320, 370/335, 342, 442, 441, 326
See application file for complete search history.

(56) References Cited

U.S. PATENT DOCUMENTS

| | | | | |
|---|---|---|---|---|
| 5,237,587 A | * | 8/1993 | Schoolcraft | 375/150 |
| 5,689,526 A | * | 11/1997 | Slonneger et al. | 375/145 |
| 5,808,582 A | * | 9/1998 | Woo | 342/357.12 |
| 5,914,943 A | * | 6/1999 | Higuchi et al. | 370/320 |
| 5,920,589 A | * | 7/1999 | Rouquette et al. | 375/147 |
| 5,999,561 A | * | 12/1999 | Naden et al. | 375/142 |
| 6,038,250 A | * | 3/2000 | Shou et al. | 375/143 |
| 6,067,292 A | * | 5/2000 | Huang et al. | 370/342 |
| 6,104,748 A | * | 8/2000 | Kaku | 375/235 |
| 6,151,353 A | * | 11/2000 | Harrison et al. | 375/136 |
| 6,167,037 A | * | 12/2000 | Higuchi et al. | 370/335 |
| 6,195,399 B1 | * | 2/2001 | Dent et al. | 375/322 |
| 6,289,041 B1 | * | 9/2001 | Krasner | 375/152 |
| 6,298,227 B1 | * | 10/2001 | Molnar | 455/323 |
| 6,310,856 B1 | * | 10/2001 | Taipale | 370/208 |
| 6,359,940 B1 | * | 3/2002 | Ciccarelli et al. | 375/316 |
| 6,434,186 B1 | * | 8/2002 | Dowling | 375/147 |
| 6,470,055 B1 | * | 10/2002 | Feher | 375/259 |
| 6,493,378 B1 | * | 12/2002 | Zhodzishsky et al. | 375/149 |
| 6,507,576 B1 | * | 1/2003 | Suzuki et al. | 370/342 |

\* cited by examiner

*Primary Examiner*—Emmanuel Bayard
(74) *Attorney, Agent, or Firm*—John Bruckner PC

(57) ABSTRACT

A method of tracking a pilot channel to discipline an oscillator includes: downconverting the RF signal to a low frequency that is of the order of, but greater than the chip rate; converting the signal into digital format; computing complex correlations between the received digital signal and local replicas of the PN codes; and establishing from the correlation values what is the nominal frequency error of the local oscillator. Correlation values between the digital signal $\{s(n)\}$ and at least one locally generated version of I-channel and Q-channel PN signals $\{I_{PN}(n)\}$ and $\{Q_{PN}(n)\}$ are averaged over multiple periods of the PN signals. Pilot signal tracking accuracy is improved, computational load is reduced without degradation in performance, and the technique is simple enough to be incorporated in an off-the-shelf FPGA.

53 Claims, 8 Drawing Sheets

PN sequence rate = 1.2288 Mcps; period = $2^{15}$ chips
RF carrier frequency = $f_c$ (Hz)

PILOT TRACKING FOR SYNCHRONIZATION USING CORRELATION BETWEEN DIGITAL SIGNAL AND LOCALLY GENERATED VERSION OF PN SIGNAL

CROSS-REFERENCE TO RELATED APPLICATION

This application is a continuation-in-part under 35 U.S.C. § 120 of copending U.S. Ser. No. 60/130,088, filed Apr. 20, 1999, now pending, the entire contents of which are hereby incorporated herein by reference as if fully set forth herein.

BACKGROUND OF THE INVENTION

1. Field of the Invention

The invention relates generally to the field of code division multiple access (CDMA). More particularly, the invention relates to CDMA pilot tracking for synchronization.

2. Discussion of the Related Art

Cellular telephony based on CDMA operates in two frequency bands in the US. The first band is the regular cellular band wherein base stations transmit using RF carrier frequencies of approximately 870 MHz. The second band is the PCS band wherein base stations transmit using RF carrier frequencies of approximately 1960 MHz. The principles of CDMA are well known and detailed specifications are established.[1-3]

Fundamental to the operation of CDMA is the notion of the pilot channel which is transmitted by the base station. The sole purpose of the pilot channel is to allow the mobile station to acquire synchronization which is a prerequisite for extraction of any data (such as encoded speech). All CDMA base stations derive their timing from GPS (global positioning system) signals. Thus, any timing derived from the base station transmitted signal, namely the pilot channel is traceable to the GPS, provided the base station is not in a holdover mode of operation.

The pilot channel is a "constant" signal which, because of its deterministic nature, is suitable for acquisition and tracking. The "information" carried by the pilot channel is solely that of timing. It is generated by modulating a constant pattern onto the RF carrier. The construction of the pilot channel is depicted in FIG. 1.

The pilot channel is obtained by taking a constant pattern (e.g., all–1s) and spreading it using the I-channel and Q-channel PN (Pseudo Noise) sequences which have a chip-rate of 1.2288 Mcps. For convenience, the chip values are chosen as +1 and –1 though in an actual digital implementation the values would correspond to a logic-1 and logic-0, respectively. Following the spreading operation, the I and Q impulses are processed by identical baseband filters which provide the bandwidth limitation (intentional inter-symbol-interference) and pulse shaping functions. The I and Q channels are modulated onto the in-phase and quadrature RF carriers and summed to create the pilot channel signal s(t). The pilot channel and other channels (speech, paging, synchronization., etc.) are combined as a weighted sum so as the create the composite transmit signal whose power is nominally a constant. Thus, depending on the traffic, the radiated signal power associated with the pilot signal can be variable. Normal practice is to ensure that the pilot signal power is at least 10% of the radiated power.

The properties associated with the pilot channel are reflected directly in the ability of a receiver to extract proper synchronization. The fundamental aspects of the pilot channel are discussed below.

The I-channel and Q-channel PN sequences are periodic "noise-like" sequences which have a period of $2^{15}$ chips. They are derived from PRBS (pseudo-random binary sequence; also referred to as maximum length linear feedback shift register sequences) which can be generated using 15-bit shift registers with appropriate feedback. A PRBS sequence has a period of $(2^{15}-1)$ bits (i.e. chips) and is characterized by having strings of 1s of all lengths upto 15 but strings of 0s up to length 14. A PN sequence is created from the underlying PRBS sequence by inserting an additional 0 after the string of 14 zeros, which occurs only once per period in the PRBS. The period of the PN sequence is thus one more than the PRBS, or $2^{15}$ bits (chips).

In IS-95 CDMA, the maximum length shift register sequences from which the PN sequences are derived are specified by the recursion relations:

$i(n)=i(n-15)\oplus i(n-10)\oplus i(n-8)\oplus (i(n-7)\oplus i(n-6)\oplus i(n-2)$ $q(n)=q(n-15)\oplus q(n-12)\oplus q(n-11)\oplus q(n-10)\oplus q(n-9)\oplus q(n-5)\oplus q(n-4)\oplus q(n-3)$ where i(n) and q(n) are binary-valued ('0' and '1') and the additions are modulo-2. The '0' inserted after the 14-th zero of the string of 14 consecutive zeros in the PRBS is, by definition, the "last" bit of the period; the subsequent '1' is considered the first bit of the next period. The start of this first bit (chip) interval is aligned with CDMA system time.

The correlation between two sequences, $\{\alpha(n)\}$ and $\{\beta(n)\}$, where $\{\alpha(n)\}$ is assumed to be periodic with length N (bit-times), is defined as $$R_{\alpha\beta} = \sum_{n=0}^{N-1} \alpha(n) \cdot \beta(n)$$

This can be extended to the notion of an auto-correlation sequence and a cross-correlation sequence if it is assumed that the periods of the two sequences are the same. These extensions take the form $$R_{\alpha\alpha}(k) = \sum_{n=0}^{N-1} \alpha(n) \cdot \alpha(n-k)$$

$$R_{\alpha\beta}(k) = \sum_{n=0}^{N-1} \alpha(n) \cdot \beta(n-k)$$

where the correlation lag, k, indicates the delay introduced for the second sequence prior to computing the correlation.

PRBS sequences, generated using linear feedback shift registers, have an especially nice auto-correlation property. In particular, if $\{\alpha(n)\}$ is a PRBS sequence of length $N=2^K-1$, and the values are treated as +1 and –1 (for '1' and '0'), then the sequence $R_{\alpha\alpha}(K)$ will be two-valued (and of course periodic) with $R_{\alpha\alpha}(K)=N$ for k=0 and $R_{\alpha\alpha}(K)=-1$ for other values of correlation lag. That is, the auto-correlation sequence is (approximately) a Kronecker Delta function. This is the basis for considering such sequences "white-noise" or "white-noise-like." Furthermore, the cross-correlation between two different PRBS sequences of the same length is approximately zero. Extending the PRBS sequences to the PN sequences by inserting an extra '0' (or –1, depending on one's convention) does not alter the auto-correlation and cross-correlation properties to any great degree. Hence, the particular choice in IS-95 CDMA for generating the I-channel and Q-channel PN sequences.

For reference, the auto-correlation and cross-correlation properties of the I-channel and Q-channel sequences for IS-95 CDMA are listed directly below:
PRBS sequences:
Auto-correlation at zero-lag=32767
Maximum auto-correlation (magnitude) non-zero-lag=1
Maximum (magnitude) cross-correlation=257 (between I and Q) PN sequences:
Auto-correlation at zero lag=32768
Maximum auto-correlation (mag.) non-zero-lag=420 (I-channel)
Maximum auto-correlation (mag.) non-zero-lag=288 (Q-channel)
Maximum (magnitude) cross-correlation=676 (between I and Q)

What is implied by these numbers is that the extension of the sequences from PRBS to PN in the manner chosen "degrades" the noise-like behavior of the sequences. Defining a figure of merit for a sequence as the ratio of auto-correlation at zero lag to the (magnitude) of the (largest) auto-correlation at non-zero lags, it can be appreciated that there is a minor degradation. A second figure of merit relates to the distinguishability between the two sequences and can be defined as the ratio of the auto-correlation at zero lag to the (largest magnitude) cross-correlation (for any lag). There is a degradation of about 8 dB inherent in the extension of the PRBS to PN sequences.

The auto-correlation properties of the PN sequences allows for the determination of the presence as well as the position of the pilot in the received radio frequency (RF) signal. Where the RF signal has been translated to baseband and sampled at the chip-rate, and denoting by $\{\alpha(n)\}$ the (periodic) normalized I-channel PN sequence (with values +1 and −1), the received signal can be modeled as $$r(n)=A\ \alpha(n-K)+\eta(n)$$

where $\{\eta(n)\}$ represents the signal component other than the I-channel pilot and is modeled, for simplicity, as a white noise sequence of power $\sigma^2$. The signal-to-noise ratio is, therefore, given by $$SNR = \frac{A^2}{\sigma^2} \text{ or } 20 \cdot \log_{10}\left(\frac{A}{\sigma}\right) dB$$

The operation of correlating this received signal with (delayed) versions of the known I-channel sequence (or "template") will now be considered. The computed correlation sequence will be designated as $\{R(k)\}$ and is given by $$R(k) = \sum_{n=0}^{N-1} r(n) \cdot \alpha(n-K) = N \cdot A \cdot \delta(k-K) + \sum_{n=0}^{N-1} \eta(n) \cdot \alpha(n-k)$$

assuming the auto-correlation of the I-channel sequence takes the form of a Kronecker Delta function. Thus, the correlation will "peak" at a lag of K chips. But, this peak may be obscured somewhat by the contribution of the correlation between the template and the noise component of the received signal (everything other than the I-channel pilot sequence component). If the "noise" component is white and uncorrelated with the I-channel sequence, then the obfuscation of the true peak has a mean value of zero and a variance equal to $N\sigma^2$. The "signal" power, namely the power associated with the correlation peak, is $N^2A^2$ and thus the "despreading" of the code provides an SNR improvement of $10 \log_{10}(N)$ dB, or about 45 dB.

IS-95 CDMA specifies a pulse-shaping filter; the baseband filter depicted in FIG. 1. The pulse shaping filter functions as a spectrum conditioning filter and is nominally a lowpass filter whose passband extends to 590 kHz and stopband starts at 740 kHz (the transition band is 590 kHz to 740 kHz). The passband ripple must be less than 1.5 dB and minimum stopband attenuation must be 40 dB. The manner in which it is specified indicates that Qualcomm Inc. (who originated IS-95) implements this filter as an FIR filter operating at a sampling rate of 4*1.2288 MHz (4 times chip rate). In fact the FIR filter is described as a length 48 FIR filter with even symmetry and the coefficients, $\{h(n); n=0,1,\ldots, 47\}$, provided in IS-95.

The generation of the filtered I-channel and Q-channel signals is depicted in FIG. 2 explicitly shows just the I-channel. The Q-channel is similar.

The chip-rate PN sequence, $\{i(n)\}$, is oversampled by inserting 3 zeros between successive samples to yield the signal $\{\alpha(n)\}$ at the higher sampling rate of 4.9152 MHz (4 times the chip-rate). The output of the 48-point FIR filter provides $\{\gamma(n)\}$, the spectrum-shaped I-channel pilot signal (still at base-band). The period is now $4*2^{15}=2^{17}$ samples (4 samples per chip). The auto-correlation of the signal $\{\alpha(n)\}$ is much the same as the correlation of the PN sequence itself and can be approximated by the Kronecker Delta function. The cross-correlation between $\{\alpha(n)\}$ and $\{\gamma(n)\}$ is not, however, a Delta function but takes on the shape of the impulse response of the FIR filter. Specifically, $$R_{\alpha\gamma}(k) = \sum_{n=0}^{N-1} \alpha(n) \cdot \gamma(n-k) = \sum_{m=0}^{47} \sum_{N=0}^{N-1} \alpha(n) \cdot \alpha(n-k-m)h(m) = h(k)$$

using the approximation that the auto-correlation of $\{\alpha(n)\}$ is indeed a Delta function. Thus, the correlation sequence follows the impulse response of the filter. The filter, having symmetric coefficients, introduces a flat delay of 23.5 samples, effectively moving the peak of the correlation sequence. It also introduces a spread; the correlation sequence is not a Delta function anymore. The filter coefficients, normalized to a maximum of unity, have the following behavior around the mid-point:

h(19)=h(28)=−0.1405; h(20)=h(27)=0.0946; h(21)=h(26)= 0.4414 h(22)=h(25)=0.7858; h(23)=h(24)=1.0

The implication of this spread is that if the correlation is done at the chip-rate without a "matched" filter, then there will be an uncertainty as to the true "peak" since two correlation values will be nominally equal and the presence of any noise may cause a shift one way or the other, introducing a systemic uncertainty of (¼)-chip in the estimate of the peak.

The matched filter is used prior to computing the correlation. Since the baseband filter is symmetric, the matched filter is the same and thus the correlation spread is governed by the impulse response of the filter obtained by convolving $\{h(n)\}$ with itself. It can be shown that the operation of matched filtering improves the situation by providing a unique peak. For the filter specified in IS-95, the result of convolving the filter with itself gives rise to impulse response coefficients which are described below for 10 lags around the peak (the filter is symmetric):

h*h(0)=3.94; h*h(1)=3.54; h*h(2)=2.48; h*h(3)=1.14 h*h(4)=−0.029 h*h(5)=−0.697; h*h(6)=−0.772; h*h(7)=−0.408; h*h(8)=0.101 h*h(9)=0.465

If these values are normalized to a maximum (central peak=unity), the following results are obtained:

h*h(0)=1.0; h*h(1)=0.898; h*h(2)=0.629; h*h(3)=0.289 h*h(4)=−0.007 h*h(5)=−0.177; h*h(6)=−0.196; h*h(7)=−0.104; h*h(8)=0.026 h*h(9)=0.118

It is seen that the peak value (un-normalized) and the correlation value offset by one sample (which is a quarter-chip) are 3.94 and 3.54, respectively. Consequently, the presence of noise may cause an error in picking the correct peak but if the post-correlation SNR is greater than 20 dB, the probability of this occurring is less than about 0.33 (33% of the time). Secondary peaks are also present but the highest secondary peak (greater than 4 lags from the true peak) is down about 14 dB.

However, implementing this matched filter, even assuming undersampling by a factor of 4 to reduce the sampling rate to the chip-rate, requires roughly 60 million multiplies per second for each of the I- and Q-channels. This is well beyond the capabilities of any current off-the-shelf DSP, especially if the DSP has to do any other task at all! When integrated into an ASIC as a specialized function it is feasible and may be performed in the Qualcomm chip-set.

The pilot tracking method is depicted in the simplified block diagram shown in FIG. 3. The RF signal is translated down to baseband (center frequency=0 Hz, i.e., dc). FIG. 3 shows a single translation whereas in practice a dual down-conversion scheme will be employed with an IF frequency where a (usually SAW) filter is used to define the channel selected. The term (t-τ) relating to the LO signal indicates that the LO phase and the transmitter carrier phase may be different. The in-phase and quadrature demodulated signals are passed through a matched filter, denoted by H*(f), and sampled at the chip-rate (1.2288 MHz) though the phase of the sampling clock may be adjustable. This is indicated by showing the sampling "starting" at time=$t_0$ with samples taken every $T_c$ units of time ($T_c$ is the chip-interval). The sampled in-phase and quadrature signals are correlated using the I-channel and Q-channel PN sequences as templates in a "complex" fashion which is necessitated since the relative phase of the LO and transmit oscillators is an unknown (but assumed fixed) value. The value $t_0$ is varied over the range required (one period of the PN sequences, i.e., $2^{15}$ chips). During the "acquisition" phase, to speed up the time for acquisition, the correlation may be done over a partial period.

The Qualcomm Reference design, which is used by all CDMA mobile handsets uses a 19.68 MHz VCXO which is "locked" to the code-rate by the pilot tracking method which uses a conventional "early", "late", and "on-time" correlation mechanism. The RF signal is translated to in-phase and quadrature signals centered at dc and lowpass filtered prior to A/D conversion (one converter for the in-phase and one for the quadrature). The conversion clock is derived from the 19.68 MHz VCXO and it has been observed that this derived sampling clock is not smooth but does have some jitter. The "matched filter" is implemented using DSP. A general block diagram depicting the Qualcomm reference design is shown in FIG. 4.

The sampling jitter and the imperfection of matching between the two A/D converters and the mismatch between the two lowpass filters (pre-A/D-conversion filters) cause errors in the tracking of the pilot. Therefore, what is needed is an approach that tracks the pilot signal with greater accuracy.

The IS-95 specification calls for the base-station signal processing chain to include an allpass filter, ostensibly to compensate for the non-linear-phase characteristics of the pre-A/D filter called for in the Qualcomm reference design. Any design not using the Qualcomm reference design and integrated circuits (for which a significant license fee is charged) must circumvent the impact of this allpass filter which Qualcomm has mandated for the base-station in the IS-95 specification. Therefore, what is also needed is an approach that avoids the Qualcomm reference design and integrated circuits and simultaneously circumvents the impact of the allpass filter.

SUMMARY OF THE INVENTION

A goal of the invention is to simultaneously satisfy the above-discussed requirements of tracking the pilot signal with greater accuracy, avoiding the Qualcomm reference design and integrated circuits, and circumventing the impact of the allpass filter. Another goal of the invention is to simultaneously reduce the computational load without any degradation in performance and implement the technique in an off-the-shelf FPGA.

One embodiment of the invention is based on a method for tracking a CDMA pilot channel signal to discipline an oscillator, comprising: downconverting an RF signal from a RF center frequency $f_{RF}$ to an intermediate center frequency $f_L$ where $f_L$ is greater than or equal to a CDMA chip rate $f_c$, wherein downconverting includes incorporating bandpass filtering to remove extraneous signals while passing said CDMA pilot channel signal; converting a signal format from analog to digital using a single analog-to-digital converter employing a sampling rate of $f_s$ to create a digital signal $\{s(n)\}$; employing a correlation circuit to establish a correlation between $\{s(n)\}$ and locally generated versions of I-channel and Q-channel PN signals, $\{I_{PN}(n)\}$ and $\{Q_{PN}(n)\}$, respectively; and generating an estimate of a frequency error of the oscillator using correlation values corresponding to (2M+1) time shifts of $\{I_{PN}(n)\}$ and $\{Q_{PN}(n)\}$, the (2M+1) time shifts being K−$\Delta_M$, K−$\Delta_{(M-1)}$, . . . , K−$\Delta_2$, K−$\Delta_1$, K, and K+$\Delta_1$, K+$\Delta_2$, . . . , K+$\Delta_{(M-1)}$, K+$\Delta_M$, where a time shift of K corresponds to a time shift that provides the maximum correlation value, and M is greater than or equal to 1. Another embodiment of the invention is based on an apparatus to track a pilot signal, comprising: a correlator circuit adapted to compute a complex correlation between a received version of the pilot signal and locally generated versions of I-channel and Q-channel PN signals, $\{I_{PN}(n)\}$ and $\{Q_{PN}(n)\}$, respectively. Another embodiment of the invention is based on a method for tracking a CDMA pilot channel to discipline an oscillator, comprising: downconverting the RF signal from the RF center frequency, $f_{RF}$, to an intermediate center frequency of $f_L$, where $f_L$ is greater than or equal to the CDMA chip rate, $f_c$, said downconversion incorporating bandpass filtering to remove extraneous signals while passing said pilot channel signal; converting signal format from analog to digital using a single analog-to-digital converter employing a sampling rate of $f_s$ to create the digital signal {s(n)}; employing correlation to establish the correlation between {s(n)} and locally generated versions of the I-channel and Q-channel PN signals, $\{I_{PN}(n)\}$ and $\{Q_{PN}(n)\}$, respectively; and generating an estimate of the frequency error of the oscillator using correlation values corresponding to (2M+1) time shifts of the locally generated versions of $\{I_{PN}(n)\}$ and $\{Q_{PN}(n)\}$, said time shifts being $K-\Delta_M, K-\Delta_{(M-1)}, \ldots K-\Delta_2, K-\Delta_1, K,$ and $K+\Delta_1, K+\Delta_2, \ldots, K+\Delta_{(M-1)}, K+\Delta_M$, where time shift of K corresponds to the time shift that provides the maximum correlation value, and the value of M is 4. Another embodiment of the invention is based on a method of tracking a pilot signal, comprising: disciplining an osciator including generating a spectrum shaped channel pilot signal $\{\gamma(n)\}$ from a chip-rate PN sequence $\{i(n)\}$ by: oversampling the chip-rate PN sequence $\{i(n)\}$ at a higher sampling rate to yield a signal $\{a(n)\}$; passing $\{a(n)\}$ through a first FIR filter whose impulse response coefficients are $\{g(n)\}$ to yield a signal $\{\beta(n\}$; and filtering $\{\beta(n\}$ with a second FIR filter to yield the spectrum shaped channel pilot signal $\{\gamma(n)\}$. Another embodiment of the invention is based on an apparatus to a pilot signal, comprising: a correlator circuit adapted to oversample a chip-rate PN sequence $\{i(n)\}$ at a higher sampling rate to yield a signal $\{a(n)\}$, pass $\{a(n)\}$ through a first FIR filter whose impulse response coefficients are $\{g(n)\}$ to yield a signal $\{\beta(n\}$; and filter $\{\beta(n\}$ with a second FIR filter to yield a spectrum shaped pilot channel signal $\{\gamma(n)\}$.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

Within this application several publications are referenced by superscripts composed of Arabic numerals within parentheses. Full citations for these publications may be found at the end of the specification immediately preceding the claims after the section heading References. The disclosures of all these publications in their entireties are hereby expressly incorporated by reference into the present application for the purpose of indicating the background of the invention and illustrating the state of the art.

As noted above with regard to the previous approach, the sampling jitter, the imperfection of matching between the two A/D converters and the mismatch between the two lowpass filters (pre-A/D-conversion filters) all cause errors in the tracking of the pilot signal. While these errors may be tolerable with regard to normal telephony operation, they prevent the handset from tracking the pilot to an accuracy of better than a few parts in $10^{10}$.

Experiments with an actual Qualcomm reference standard compliant CDMA (PCS) handset where conducted. The local oscillator output signal was extracted and the results showed that the frequency accuracy obtainable was only about 3 parts in $10^{10}$. While this is adequate for purposes of telephony, it is inadequate for purposes as a synchronization reference which requires a frequency accuracy of better than 1 part in $10^{11}$. The invention can provide this higher accuracy. The invention can discipline a local oscillator [e.g., rubidium or high-quality quartz] using the principles of BesTime for ensembling multiple references (BesTime is a technique developed by Symmetricom, Inc., for implementing multiple input frequency-locked-loops where the output is locked to an optimum average of the multiple inputs). The invention can minimize the impact of the IS-95 base station allpass filter and, without resorting to the Qualcomm reference design or integrated circuits, can provide pilot tracking ability to an accuracy of better than parts in $10^{12}$.

Architecture

Figure 5:
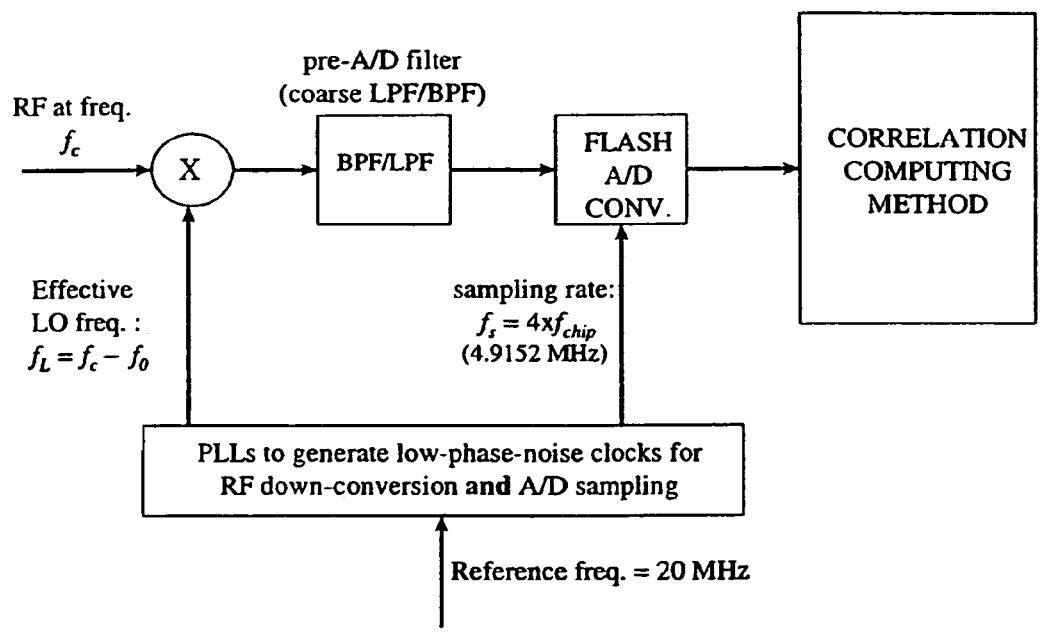
FIG. 5 illustrates a block diagram of a pilot acquisition and tracking architecture, representing an embodiment of the invention.

An outline of a pilot tracking architecture and method is depicted in the block diagram shown in FIG. 5. This pilot tracking architecture is substantially different from the Qualcomm reference design. Several specific potential differences are outlined below.

A first potential difference is in the TimeSource 2700 where a master oscillator (e.g., rubidium or quartz) is disciplined using the BesTime methodology. The reference frequency is provided as a clean 20 MHz signal. The tracking of the pilot does not reflect directly in the adjustment of the reference 20 MHz because BesTime acquires the measurements from several sources to do the adjustment.

This is in contrast with the Qualcomm design where a single pilot is tracked and used directly to adjust the VCTCXO (the 19.68 MHz local oscillator).

A second potential difference is that the translation down to baseband is to an "offset-carrier" frequency as opposed to dc as in the Qualcomm reference design. This offset carrier frequency, $f_0$, is chosen to be either $f_{chip}$ or $5 \times f_{chip}$ (the chip rate or 5 times the chip rate). Having an offset carrier implies the ability to use a single A/D converter and effectively synthesize the in-phase and quadrature components. Having a single A/D converter is advantageous since the notion of matching the in-phase and quadrature sampling processes is moot. The pre-A/D filter is principally for removing the higher frequency (image) components present. If I choose the offset carrier frequency as $f_0=f_{chip}$ then the filter is simply lowpass; if I choose $f_0=5 \times f_{chip}$ then the filter can be bandpass and remove the low frequency (interfering) components as well as the high frequency components. In the inventive approach the down-conversion is done in two stages with an IF SAW filter used to define the RF channel bandwidth. Further, to ensure the high quality tracking capability required for a synchronization reference purposes, the A/D conversion accuracy is much higher than that used for the telephony; the inventive design can use a 12-bit converter compared to (matched) 4-bit converters used in handsets.

A third potential difference is that the sampling clock design can be intentionally "jitter-free" and is derived from a VCXO that is phase-locked to the 20 MHz provided by the BesTime engine. The Qualcomm reference design obtains the conversion clock by digitally dividing down the 19.68 MHz and since it is obvious that 19.68 and 4.9152 (MHz) do not have an integer ratio, the division method will always introduce jitter.

A fourth potential difference is that the correlation can be computed in a manner quite different from the conventional method used in the Qualcomm reference design. Specifically, the correlation can be computed at lags which are commensurate with the sampling rate and thus have an "uncertainty" of (¼)-chip which is then enhanced using DSP techniques to a precision of (1/16)-chip. The Qualcomm reference design computes the correlation at lags commensurate with the chip-rate but is capable of establishing (¼)-chip resolution for the purposes of disciplining the VCTCXO which restricts the ability of the disciplining system to tracking just the single pilot (which is all one needs in a handset anyway!) with limited accuracy (though perfectly adequate for the purposes of operating as a CDMA voice handset!).

A fifth potential difference is that, the design does not employ a matched filter for reasons mentioned earlier and since the inventive pre-sampling filtering scheme is different from the Qualcomm Reference design, the impact of the base-station allpass filter will be present. It is described and show in detail below that the inventive scheme is reasonably immune to the allpass filter effect and that lack of the matched filter is, likewise, not problematic.

Correlator Principle

Figure 1:
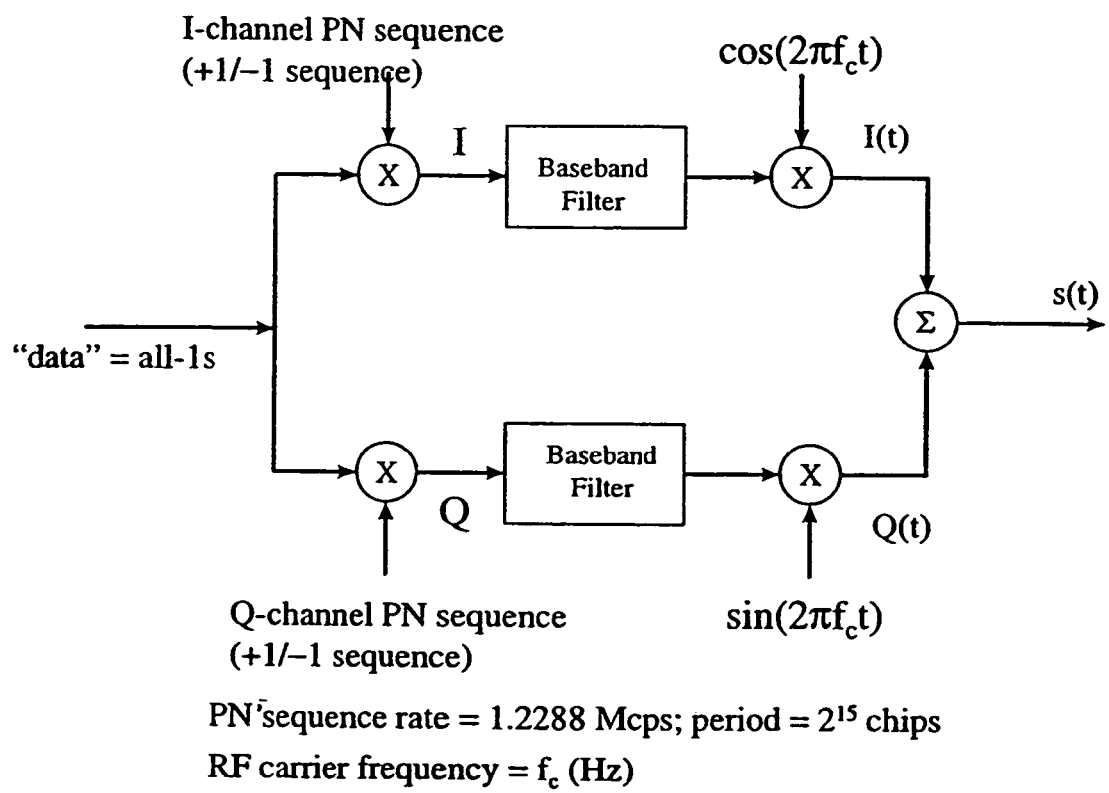
FIG. 1 illustrates a block diagram of a conventional approach to the generation of the pilot channel signal, s(t), appropriately labeled "prior art."
Figure 2:
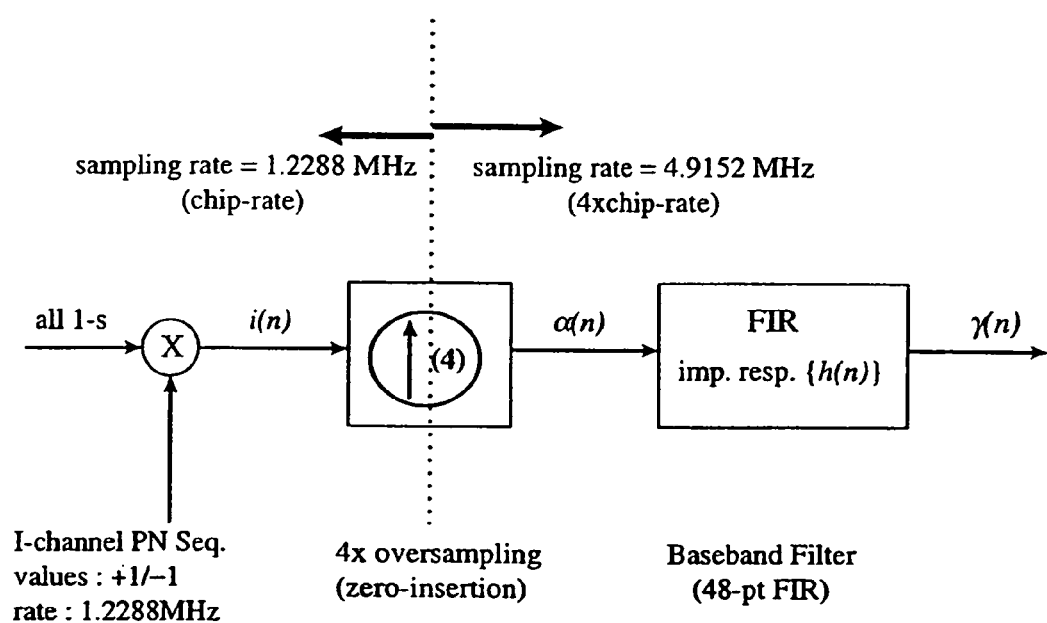
FIG. 2 illustrates a block diagram of a conventional approach to I-channel generation at a sampling rate of 4.9152 MHz, appropriately labeled "prior art."

Referring to FIG. 2, the I channel pilot signal is generated from the chip-rate PN sequence, $\{i(n)\}$, by oversampling to yield the signal $\{a(n)\}$ at the higher sampling rate of 4.9152 MHz (4 times the chip-rate) and filtering by the 48-point FIR filter. This provides $\{\gamma(n)\}$, the spectrum-shaped I-channel pilot signal (still at baseband). In a conventional scheme the receivers uses as its "template" the sequence $\{\alpha(n)\}$. In the inventive scheme a different template can be used. In preferred embodiments, the template includes the sequence $\{\beta(n)\}$ which is obtained by passing $\{\alpha(n)\}$ through an FIR filter whose impulse response coefficients are $\{g(n)\}$ (which will be specified shortly). The cross-correlation between $\{\beta(n)\}$ and $\{\gamma(n)\}$ takes on the shape of the impulse response of the FIR filter $\{h(n)\}$ used in the transmitter convolved with $\{g(n)\}$. Specifically, $$\beta(n) = \sum_l \alpha(n-l) \cdot g(l)$$

$$R_{\beta\gamma}(k) = \sum_{n=0}^{N-1} \beta(n) \cdot \gamma(n-k)$$

$$= \sum_l \sum_{m=0}^{47} \sum_{n=0}^{N-1} \alpha(n-l) \cdot \alpha(n-k-m) \cdot h(m) \cdot g(l) = \sum_l h(k-l) \cdot g(l)$$

where I have used the approximation that the auto-correlation of $\{\alpha(n)\}$ is indeed a Delta function. Thus the correlation sequence follows the impulse response of the filter used in the transmitter combined with the choice of filter used in generating the template.

An exceptionally good choice for $\{g(n)\}$ is the 4-point FIR filter often called a "rectangular" window because all 4 coefficients are equal (and the value can be normalized to 1.0). The combined form, $q=g*h$ has a flat delay of 25 samples (which, being an integer, is good). The filter coefficients, normalized to a maximum of unity, have the following behavior around the mid-point:

q(33)=q(17)=0.018; q(32)=q(18)=−0.077; q(31)=q(19)=−0.142 q(30)=q(20)=−0.112; q(29)=q(21)=0.051; q(28)=q(22)=0.331 q(27)=q(23)=0.650; q(26)=q(24)=0.903; q(25)=1.0

This may be compared with the "optimum" filter, h*h, for which the correlation behavior around the central peak is given by (see the derivation done earlier):

h*h(0)=1.0; h*h(1)=0.898; h*h(2)=0.629; h*h(3)=0.289 h*h(4)=−0.007 h*h(5)=−0.177; h*h(6)=−0.196; h*h(7)=−0.104; h*h(8)=0.026; h*h(9)=0.118

It is clear that this "sub-optimal" choice of $\{g(n)\}$ does not introduce any significant degradation in the ability to establish the peak (position) of the correlation between the pilot signal and the template. Further, implementing this choice of filter is exceptionally easy. The I-channel PN sequence is generated at the chip rate and the "oversampling" (i.e., the sampling rate increase by a factor of 4) is achieved by repeating each sample 4 times instead of inserting zeros. It has been noted that the Qualcomm reference design is tailored to the inclusion in the base-station transmitter of an allpass filter. Since the invention does not follow the Qualcomm reference design, it may appear that this allpass filter will cause an impairment. However, as can be appreciated from the following, this is not the case. This impairment can be quantified by examining the combined impulse response of the allpass filter, the pulse shaping filter, $\{h(n)\}$, and the template filter $\{g(n)\}$. Denoting this composite impulse response by $\{r(n)\}$, the coefficients around the central peak (defined as n=0) are shown below:

r(0)=1.0;

r(−1) 0.906 r(−2)=0.642; r(−3)=0.287; r(−4)=−0.044; r(−5)=−0.249 r(−6)−0.282 r(−7)=−0.169; r(−8)=0.01 . . .

r(+1)=0.910; r(+2)=0.688; r(+3)=0.422; r(+4)=0.197; r(+5)=0.0595;

r(+6)=0.0088; r(+7)=0.0196; r(+8)=0.011; . . .

Because the allpass filter is not linear-phase, the composite is no longer symmetric about its peak value. Nevertheless, it is clear that the ability to distinguish the peak is not diminished significantly.

Correlator Implementation

Figure 6:
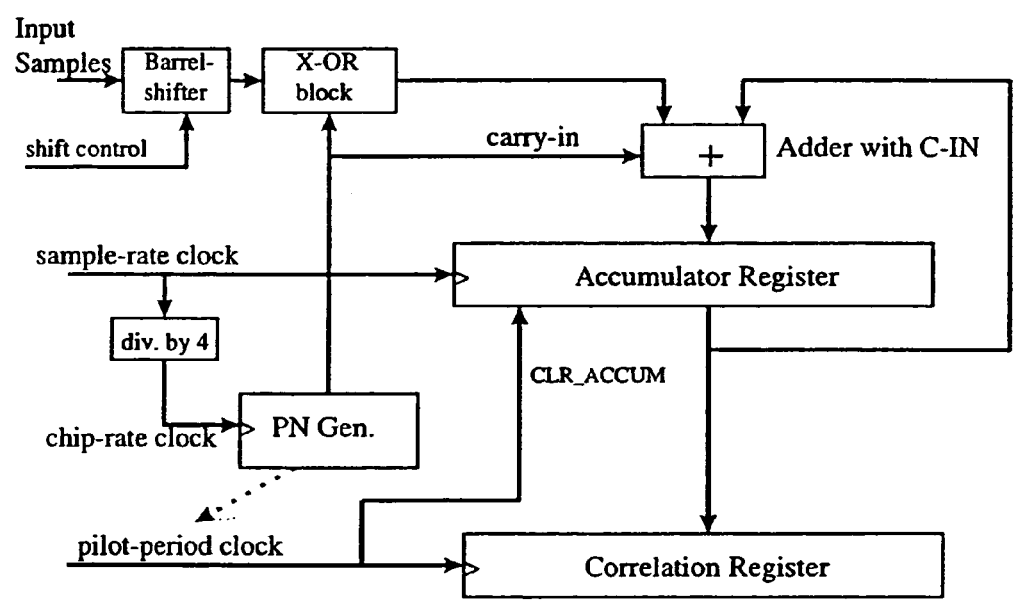
FIG. 6 illustrates a block diagram of a correlator, representing an embodiment of the invention.

A block diagram of the basic correlation mechanism is shown in FIG. 6. The PN generator generates the appropriate PN sequence. A "−1" corresponds to a logic-1 and a "+1" corresponds to a logic-0. The A/D converter provides the input samples in 2-s complement format at the sampling rate which is $4*f_{chip}$ or 4.9152 MHz. The "X-OR block" achieves the multiplication of the input samples by the PN code by inverting the bits of the input samples if the PN code-bit is logic-1 and leaving the input samples unchanged if the PN code-bit is logic-0. In 2-s complement representations, multiplication by −1 is achieved by inverting all the bits and adding 1 in the least-significant position. In FIG. 6, this operation of adding 1 in the least-significant bit position is accomplished by using the PN code-bit as the carry-in to the adder module. A typical word length for the adder module, as well as the registers, is 16 bits (though other word lengths may be used if deemed appropriate). The pilot-period clock is derived from the PN Generator and is used to load the contents of the accumulator into the Correlation Register as well as to clear the accumulator in preparation for the next pilot-period.

Figure 3:
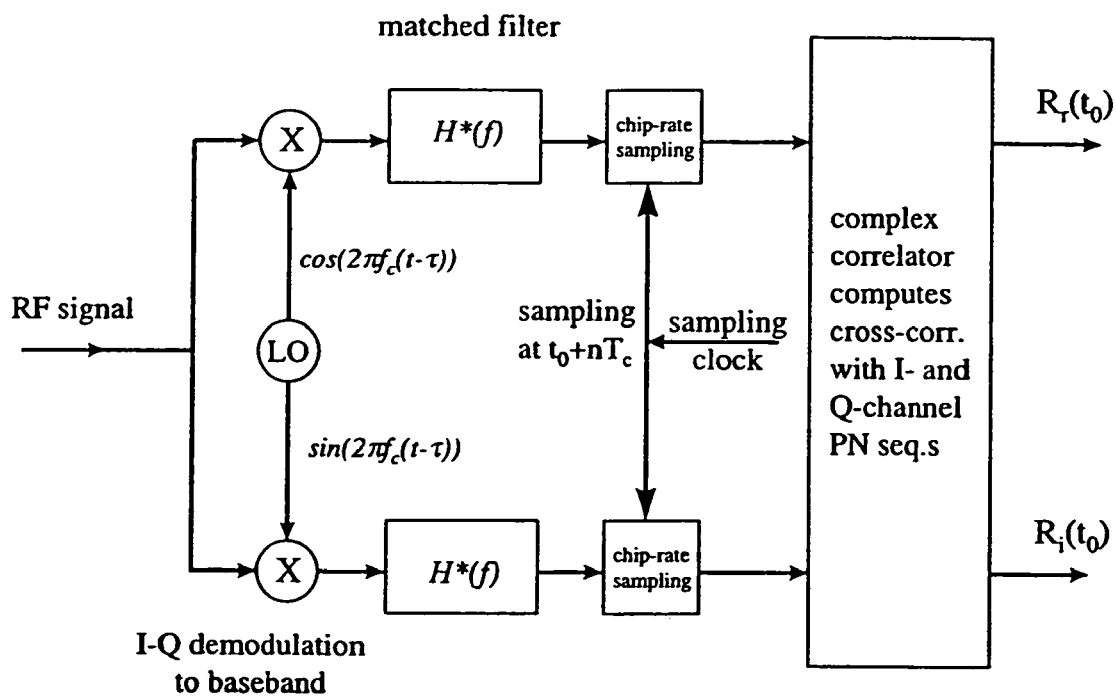
FIG. 3 illustrates a block diagram of a conventional method for pilot tracking, appropriately labeled "prior art."
Figure 4:
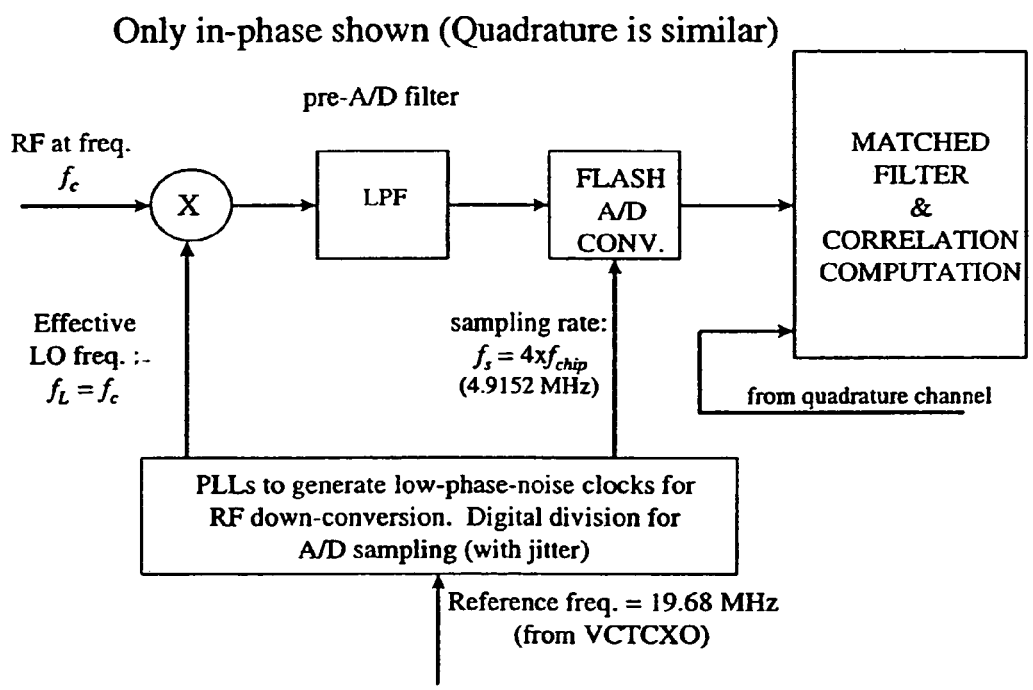
FIG. 4 illustrates a block diagram of a conventional reference design for pilot acquisition and tracking, appropriately labeled "prior art."

The "start" of the PN Generator is achieved by circuitry not shown in FIG. 6 but which defines the "phase" of the PN generator relative to some arbitrary, but known, counter. That is, there is a Master Counter which counts sampling clock pulses modulo-$2^{17}$, the period of the PN sequence(s), and the start of the PN Generator (the first "1" after 15 zeros at the chip-rate) is synchronized to a particular choice of Master Counter value. This "start_count" is analogous to $t_0$ in FIG. 3. Consequently the contents of the Correlation Register corresponds to the cross-correlation between the incoming signal and the PN Sequence template (including the up-sampling and 4-point rectangular window) at a lag equal to the "start_count" computed over the (most-recent) complete period of the PN sequence.

The nominal word length of the A/D converter in the design is 12 bits. To prevent overflow in the correlation computation, provision is made to shift the 12-bits to occupy the least significant M (with M less than or equal to 12) of the increment to the accumulator. This pre-scales the signal down to avoid overflow though, possibly, with some impact due to the truncation error inherent in the exclusion of the least significant (12−M) bits.

Detection of overflow is done in an interesting manner. The circuitry is not shown in FIG. 6 but is described here. One property of 2-s complement arithmetic is that when I accumulate N numbers by N sequential addition operations, intermediate overflows are of no consequence if (and only if) the final result is known to be correct. That is, if I know a priori that the sum of the N numbers can indeed be represented correctly with the given word length (16 bits in the current design) then intermediate overflow indications can be ignored. In any single addition operation, overflow is indicated if the following two conditions are satisfied. First, the signs of the two inputs must be the same and second, the sign of the output sum must be different from the input(s). Overflow is contraindicated if the signs of the two inputs are different or if the sign of the output is the same as (any) one of the inputs. The consequence of an overflow is that the resulting sum is wrong and in fact has the wrong sign. It can be shown that with B-bit arithmetic, interpreting the numbers as signed integers, the (wrong) B-bit sum of two B-bit numbers (wrong because of overflow) is in error by $2^B$ Thus, if I monitor the number of overflows involved in computing the N-sum correlation, and the number of overflows was an odd number, then the final result is wrong. If the (eventual) accumulator content is wrong, I "saturate" the output to the largest positive (negative) number when the sign of the (wrong) sum is negative (positive). There is a common misconception that if there was an even number of overflows, then the resulting sum is correct. More correctly, if there were an equal number of overflows in the positive and negative directions (which implies an even number of overflows), then the sum is correct. In many cases this will indeed be true and thus the misconception. In the inventive correlator design I monitor both "positive" overflows and "negative" overflows (a "positive" overflow occurs when I add two positive numbers to get a negative sum; a "negative" overflow occurs when I add two negative numbers to get a positive sum). If the number of positive overflows is different from the number of negative overflows, then the (eventual) accumulator contents are wrong and corrective action, comprising saturation of the output, must be taken.

The incoming sequence of numbers from the A/D converter is, however, not the true base-band signal but comprises samples of the CDMA signal which still has a residual (or "offset") carrier of 1.2288 MHz (the chip-rate). To get the true correlation, the input signal needs to be translated down to zero-offset-carrier (essentially no residual carrier). This is addressed next.

The Offset Carrier Correlator

Denote by $\{\gamma(n)\}$ the I-channel signal including the baseband and allpass filters. Likewise, denote by $\{\eta(n)\}$ the Q-channel signal. These are the representations at a sampling rate $f_s=4*f_{chip}$ or 4.9152 MHz. The analog equivalents at radio frequency (RF) are obtained by modulating the I-channel signal onto the in-phase RF carrier and the Q-channel onto the quadrature RF carrier. Essentially, the composite RF signal is given by $$s_T(t)=\gamma(t)\cdot\cos(2\pi f_c t+\phi)+\eta(t)\cdot\sin(2\pi f_c t+\phi)$$

where I have arbitrarily normalized the carrier amplitude to unity, denoted the RF carrier frequency by $f_c$, and assumed an unknown (but fixed) reference phase offset, $\phi$. This phase offset is with respect to the phase of the effective LO signal used for demodulation (in the receiver).

For purposes of analysis and illustration, it is assumed that the radio propagation path is benign and thus can be "ignored". In the "radio path" I are including all the RF facets of the transmitter and receiver as well. In the Qualcomm reference design the received signal, which is equivalent to s(t) under the assumption of a benign radio path, is translated down to dc using an in-phase and quadrature (effective) LO arrangement. In the inventive design a single (as opposed to in-phase and quadrature) (effective) LO is used to translate the received signal to a center frequency of $f_{chip}$ or $5*f_{chip}$.

The A/D converter operates at a sampling frequency $f_s=4*f_{chip}$ and thus after conversion the effective center frequency is $f_{chip}$. Hence the sampled signal can be written as $$s(n)=A\gamma(n)\cdot\cos(\omega_0 n+\phi)+A\eta(n)\cdot\sin(\omega_0 n+\phi)+\Psi$$

where $$\omega 0 = \frac{2\pi f_{chip}}{f_s}$$

(normalized radian frequency)

where A is a constant reflecting the conversion gain, transmission loss and other gain factors. The term $\Psi$ is used to represent, generically, all the extraneous signals present. These extraneous signal could include other CDMA channels, quantization noise, etc. If the local oscillator and the oscillator used in the transmitter are not "locked" then there may be a slight frequency offset. This has the effect of making the effective phase difference, $\phi$, vary with time. I assume that this frequency difference is small enough such that over the interval I am computing the correlation that $\phi$ is constant. Thus if I am computing the correlation over a complete period of the pilot signal, that is, $2^{17}$ samples, the change in $\phi$, over the accumulation interval will be $2\pi.\Delta f.2^{17}$ radians, where $\Delta f$ is the fractional frequency difference (difference normalized by $f_s$). If the fractional frequency difference is of the order of one part in $10^8$, then the change in phase over one pilot period is, roughly, the equivalent to ($\frac{1}{800}$)-sampling-interval in time. Whereas this drift may be negligible over one pilot period it is very substantial over 1 second (or thereabouts). This impairment must be kept in mind when I use averaging techniques to improve the quality of pilot position estimation.

One should keep in mind that the frequency difference referred to in the previous paragraph is that measured at the A/D converter. If the reference 20 MHz signal in the receiver and the equivalent in the transmitter have a fractional frequency difference of $\Delta$, then the actual frequency difference would be $\Delta(f_c/20)$ where $f_c$(MHz) is the RF center frequency. In PCS, $f_c$ is of the order of 2000 MHz and thus there is an inherent error multiplication by a factor of 100. Thus if the receiver timebase and transmitter timebase differ by 1 part in $10^8$, the fractional frequency difference at the A/D converter would be 1 part in $10^6$, or roughly equivalent to ($\frac{1}{8}$)-sampling-interval. When the underlying oscillator in the TS-2700 (a product designed by Symmetricom, Inc.) is atomic (Rubidium) the timebase difference is not expected to be worse that 1 part in $10^8$ but is in all probability less than 1 part in $10^9$ and thus is not a significant problem. If the underlying oscillator is quartz based, the timebase error (prior to acquisition and tracking) could be of the order of 1 part in $10^6$. In this case the Pilot Tracking Receiver must in and of itself establish a carrier tracking mechanism. One method for achieving this carrier (frequency) tracking has been devised and is the subject of a separate disclosure.

Translating down to baseband (dc) is achieved via digital multiplication of $\{s(n)\}$ with a complex exponential. In particular, the complex baseband signal can be written as $$w(n)=\alpha(n)+j\cdot\beta(n)=s(n)\cdot e^{-j\omega_0 n}$$

where I use the notation $\{\alpha(n)\}$ and $\{\beta(n)\}$ to denote the real and imaginary parts of the complex baseband signal, $\{\omega(n)\}$. This complex signal must be correlated with each of the I-channel and Q-channel templates. Denote the I-channel template by $\{a(n)\}$ and the Q-channel template by $\{b(n)\}$ (for the correlation lag chosen). Then the (complex) correlation values over 1 period (N=$2^{17}$ samples) with the I-channel, R, and with the Q-channel, Q, can be written as:

$$R=R_r+j\cdot R_i=\Sigma w(n)\cdot a(n)=\Sigma s(n)\cdot\cos(\omega_0 n)\cdot a(n)-j\Sigma s(n)\cdot\sin(\omega_0 n)\cdot a(n)$$

$$Q=Q_r+j\cdot Q_i=\Sigma w(n)\cdot b(n)=\Sigma s(n)\cdot\cos(\omega_0 n)\cdot b(n)-j\Sigma s(n)\cdot\sin(\omega_0 n)\cdot b(n)$$

From this the complex correlation, (R+jQ) can be written as $(C_R+jC_I)$ where $$C_R=\Sigma s(n)\cdot[a(n)\cdot\cos(\omega_0 n)+b(n)\cdot\sin(\omega_0 n)]$$

$$C_I=\Sigma s(n)\cdot[b(n)\cdot\cos(\omega_0 n)-a(n)\cdot\sin(\omega_0 n)] \quad\text{(KEY)}$$

Considering that the modulation generates terms with center frequency $2\omega_0$ which will average to zero over the correlation accumulation, and that the correlation between $\{a(n)\}$ and $\{\eta(n)\}$, as well as the correlation between $\{b(n)\}$ and $\{\gamma(n)\}$, is nominally zero {the I-channel and Q-channel sequences are nominally uncorrelated}, I can show that the complex correlation can be expressed as:

$$C_R \approx \cos(\phi)\cdot[\Sigma\gamma(n)\cdot a(n)+\Sigma\eta(n)\cdot b(n)]+\Psi$$

$$C_I \approx \sin(\phi)\cdot[\Sigma\gamma(n)\cdot a(n)+\Sigma\eta(n)\cdot b(n)]+\Psi$$

Here too, the term $\psi$ represents all extraneous components in a generic fashion. The magnitude (squared of the complex correlation can be obtained as the sum of the squares of the real and imaginary parts and is given by $$C_{MS}=(C_R)^2+(C_I)^2\approx[\Sigma\gamma(n)\cdot a(n)+\Sigma\eta(n)\cdot b(n)]^2+\Psi$$

Here too, the term $\Psi$ represents the extraneous components. By computing $C_{MS}$ for multiple lag values I can ascertain the position of the pilot signal in time relative to the local time origin. This will be the lag value for which $C_{MS}$ is a maximum. The maximum value also provides an indication of the strength of the pilot signal. If the maximum value is commensurate with the "background" correlation levels, then the pilot signal is probably not present. The ratio of the maximum correlation (magnitude-squared) to the total power is an indication of "Figure of Merit" and is representative of the post-correlation signal-to-noise ratio. Also notice that the "phase offset error", $\phi$, does not appear. This is because I had assumed that it would be reasonably constant over the correlation interval. For smoothing purposes then, I could average $C_{MS}$ over multiple correlation computations in order to reduce the impact of any extraneous signal. This averaging cannot be done safely over the real and imaginary parts (which would actually be better if allowed) because of the possible frequency offset between the local timebase and transmitter timebase.

The inventive correlator architecture implements the correlation following the equation labeled "KEY" above. The specific choices of sampling rate as exactly $4*f_{chip}$ and the offset carrier as exactly $f_{chip}$ play an important part in the design. In particular, note that $\cos(\omega_0 n)$ and $\sin(\omega_0 n)$ take on the values +1, 0, and −1 only. Furthermore, the cos and sin functions are such that when cos is ±1, then sin is zero;

likewise when sin is ±1, then cos is zero. Also, {a(n)} and {b(n)} are "binary valued" with values ±1. Therefore, $$a(n) \cdot \cos(w_o n) + b(n) \cdot \sin(w_o n) = \pm 1$$

$$a(n) \cdot \sin(w_o n) - b(n) \cdot \sin(w_o n) = \pm 1$$

Consequently, the correlation function depicted in the equation labeled KEY is actually very simple to implement. The incoming signal is either passed through or negated in a manner that can be easily accomplished with simple logic circuits.

Figure 7:
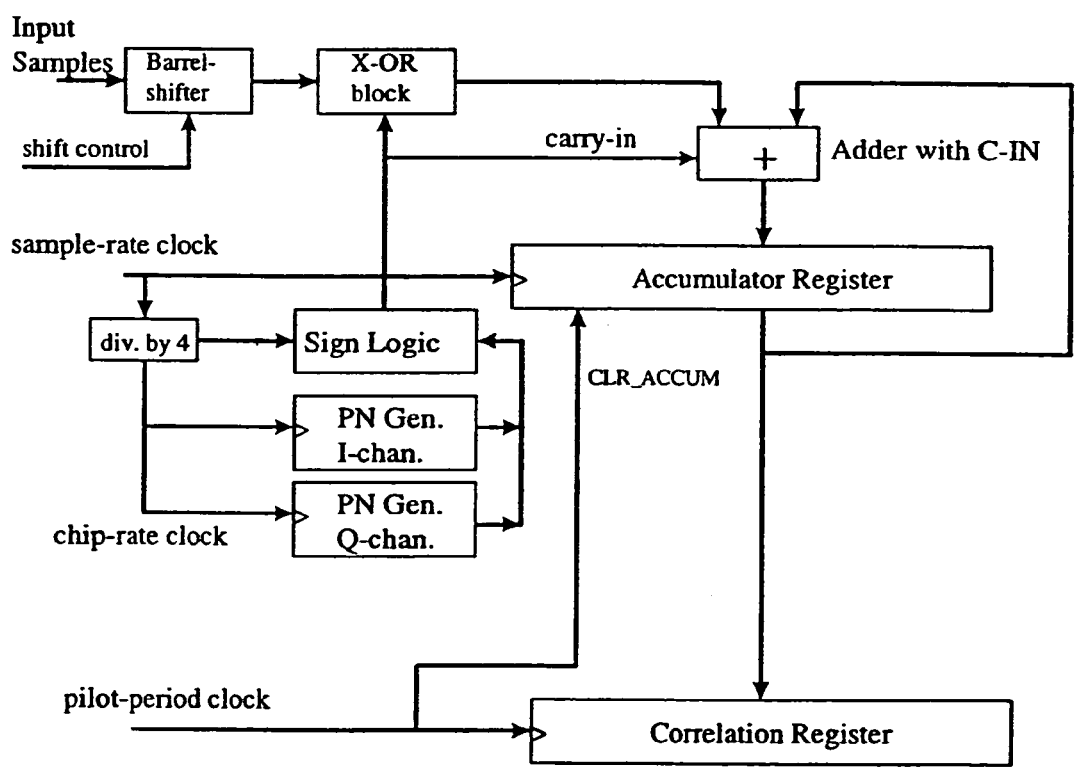
FIG. 7 illustrates a block diagram of a correlator including an off-set carrier contribution, representing an embodiment of the invention.

A block diagram depicting the inventive correlator which includes the offset carrier implication is shown in FIG. 7. Only one correlator is shown; two are required to get both the real and imaginary parts.

Pilot Tracking Method

In the inventive pilot tracking receiver, the correlators are implemented in an FPGA. There is also a general purpose DSP for ancillary calculations. The DSP receives the output of the A/D converter "on demand". The DSP sets up the FPGA-implemented correlator channels for the appropriate correlation lags, reads the correlation outputs and computes the magnitude-squared correlation value. The decision making processes are resident in the DSP. The DSP also takes routine snap-shots of M samples of the A/D output for purposes of computing raw signal power and using this for controlling the AGC functions. These computed values are provided to the main processor of the clock-control section for purposes of disciplining the oscillator.

By using multiple correlators in parallel, or by "time-sharing" correlators, multiple pilots can be tracked. This multiple pilot tracking capability is very useful when used in conjunction with the BesTime algorithm implemented in the main processor.

After pilot acquisition (described next), the tracking procedure follows the following algorithm. The acquisition phase determines the quantity D which is a number between 0 and ($2^{17}-1$) representing the position of the pilot "start-of-code" relative to a free-running modulo-$2^{17}$ counter (the Master Counter). In each measurement cycle, say cycle K, the DSP commands the correlator circuit to compute the correlation (complex) for lags between [D(K−1)−d] and [D(K−1)+d−1] {for a total of 2 d lags}. For each lag several calculations can be done with the average of M of the magnitude-squared of the values provided by the correlator used to represent the magnitude-squared-correlation-value for that lag. The lag corresponding to the largest of these 2 d values is considered as D(K), the pilot position for this, the K-th measurement cycle. The nominal precision of this position is to within approximately one lag which is approximately (¼)-chip-time. In situation of good signal-to-noise ratio, this precision can be enhanced by pattern matching with the expected pattern of correlation values around the peak. It has been observed in practice that modifying D(K) by approximately ±(½)-lag-time or even approximately ±(¼)-lag-time provides only marginal improvement and can even be contraindicated in situations of low signal-to-noise ratio.

Next, this value of peak magnitude-squared correlation is tested to see if there was a "false lock". This is done by checking the peak value against thresholds. One threshold is based on the total power of the received signal. A second threshold is generated by considering the values obtained for lags 4 prior and 4 past the correlation peak (implying immediately that d is greater than 4). A third threshold is generated by considering the history of the peak values over past measurement cycles. If the peak value exceeds these thresholds it is deemed true and deemed false if any of the thresholds are not exceeded. A 'leaky bucket' algorithm determines the locked state. A counter with minimum value 0 and maximum value 15 (F in Hex) is incremented by 1 if true and decremented by 2 if false. The leaky bucket counter thus indicated the phase of acquisition. If the counter is close to 15 (F) then I are locked, a counter value of 0 is searching, and in between I are in acquisition. For low values of the leaky bucket counter the range of lags, 2 d, is greater than when I am locked and the number of values in the average, M, is, likewise smaller in the acquisition than in the locked phase.

When the timebase of the receiver is synchronized to the timebase of the transmitter, then D(K) should be a constant. In practice, because of extraneous signals, noise, multi-path propagation effects, and other such impairments, D(K) will not be the same from one measurement cycle to the next. In the current design the DSP does some smoothing on the measurement, effectively increasing the resolution from (¼)-chip-time to (¹⁄₁₆)-chip-time.

Pilot Acquisition Method, Initial Phase

The DSP can search over the known RF frequencies to establish which RF carrier(s) are in operation in the geographical location where the device is installed. In the PCS band there are competing schemes, namely GSM and CDMA, which share the RF spectrum from 1930 to 1990 MHz. For CDMA operation, there are 42 RF carrier frequencies specified. These are defined by the equation [1930+ 0.05*CHNO] MHz where the defined values for CHNO are listed below:

Band A: CHNOs specified are 25, 50, . . . , 275 {11 choices} which I shall renumber (and call RFNO) as 1, 2, . . . , 11. The frequencies are 1931.25, 1932.5, . . . , 1943.75 MHz. The frequencies follow the pattern [1930+ 1.25*RFNO] MHz.

Band D: CHNOs specified are 325, 350, and 375 {3 choices} which I shall renumber as RFNOs 13, 14, and 15. The frequencies follow the pattern [1930+1.25*RFNO] MHz.

Band B: CHNOs specified are 425, 450, . . . , 675 {11 choices} which I renumber as RFNOs 17, 18, . . . , 27. The frequencies follow the pattern [1930+1.25*RFNO] MHz.

Band E: CHNOs specified are 725, 750, and 775 {3 choices} which I shall renumber as RFNOs 29,30, and 31. The frequencies follow the pattern [1930+1.25*RFNO] MHz.

Band F: CHNOs specified are 825, 850, and 875 {3 choices} which I shall renumber as RFNOs 33, 34, and 35. The frequencies follow the pattern [1930+1.25*RFNO] MHz.

Band C: CHNOs specified are 925, 950, . . . , 1175 {11 choices} which I renumber as RFNOs 37, 38, . . . , 47. The frequencies follow the pattern [1930+1.25*RFNO] MHz.

The renumbering was for convenience. Note that the specification for CDMA frequencies excludes CHNOs 300, 400, 700, 800, and 900.

Depending on the geographical area, frequencies from the set described above may not be assigned for CDMA but may be assigned for GSM usage. Consequently the acquisition phase, which starts with determining which RF carrier is being used for CDMA in that area, cannot simply use an RSSI indicator or raw power. The inventive scheme uses the fact that GSM has a bandwidth of 200 kHz, compared to about 1.5 MHz for CDMA, and that rational frequency planners will not use adjacent CHNOs in any geographical area. So I measure the raw total power to get a first indication of whether there is any signal present at the chosen center frequency. A second indication is obtained by using three digital bandpass filters of nominal bandwidth 200 kHz with one placed at the channel center frequency (which after translation is $f_{chip}$) and the other two centered at 200 kHz higher and lower than the channel center. If the signal is GSM then the outer filters will have significantly less power than the center whereas if the signal is CDMA, which has a nominally flat power spectrum, the three filters will have, approximately, the same power content. Using this scheme I can search the available channels to determine which are probably being used for CDMA and also which seems to be the strongest. The inventive design allows for multiple pilots acquired on different frequencies within the band. A third indication, which is much slower in operation, is whether a pilot can be acquired once the RF channel has been selected.

Pilot Acquisition Method, Operational Phase

A simple method for acquiring a pilot is to allow the DSP to search over all $2^{17}$ lags possible. This, however, may be quite time consuming considering that I may dwell on a particular lag for as much as 4 pilot-code periods. A much better method, and one which can be running in a background mode to acquire additional pilots, even after one or more has been found, has been devised.

Figure 8:
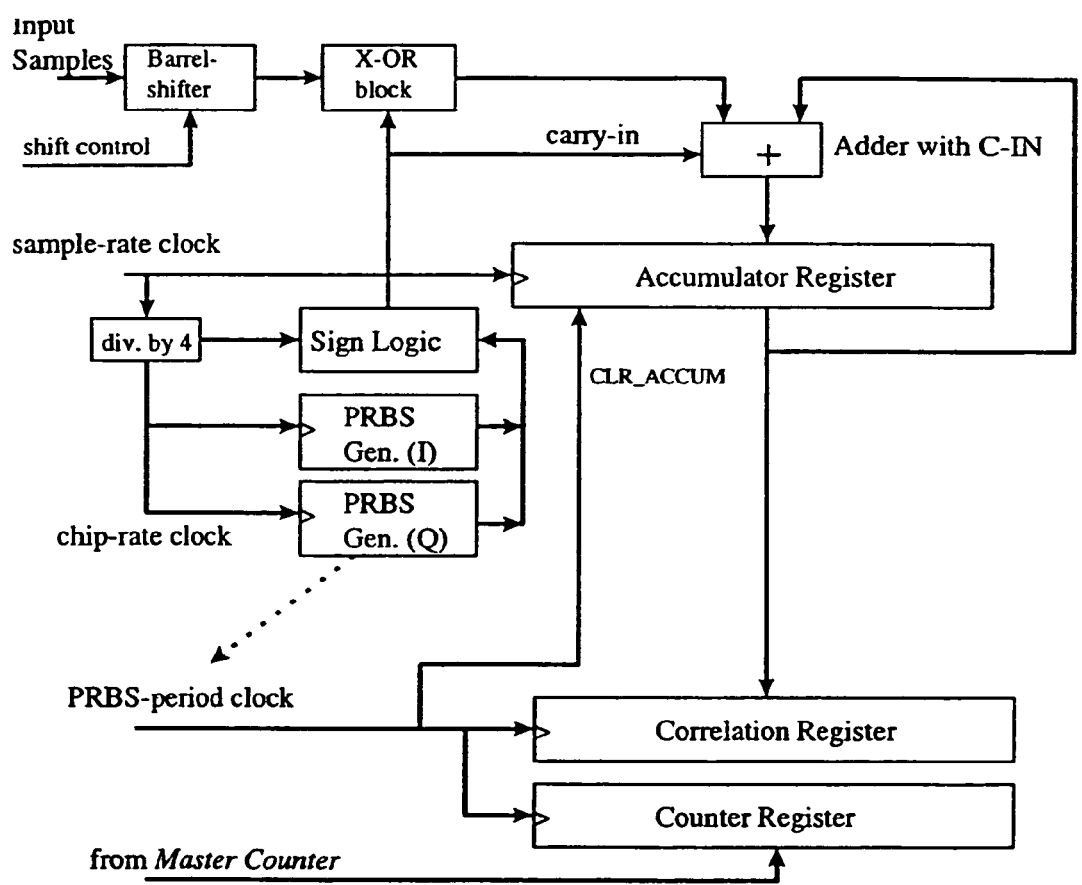
FIG. 8 illustrates a block diagram correlator for pilot acquisition (search), representing an embodiment of the invention.

This method uses the fact that the PN code used for the I-channel and Q-channel are derived from an underlying PRBS sequence whose length is $(2^{15}-1)$ chips. Further, the correlation over $(2^{15}-1)$ will not be significantly different from the correlation over the full PN-sequence period of $2^{15}$ chips. By generating the code as the underlying PRBS sequence in the correlator, as opposed to the PN sequence, I get an automatic precession. In particular, the modification required to the scheme in FIG. 7 to account for this precession is depicted in FIG. 8.

As a background task, the correlator computes the correlation between the input and the PRBS (one correlator for I-channel and one for Q-channel) sequences and loads this correlation value into the Correlation Register and at the end of the PRBS period. The Master Counter value is also loaded into a Counter Register to mark the effective lag associated with this correlation. Either by interrupt or in a polling fashion, the DSP reads these two entities and determines whether a pilot was detected. This method provides a significant improvement in the elapsed time to find the first (or subsequent) pilot.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Synchronization equipment provides a timing output. An output is obtained by disciplining a local oscillator (e.g., rubidium or quartz).

A control signal for disciplining (i.e. adjusting the frequency of) the local oscillator is obtained by monitoring CDMA (cellular telephony/PCS telephony) off-air signal transmitted from one or several Base-Stations. If more than one Base-Station can be monitored, then a "Multiple-Input Frequency Locked Loop" (or MIFLL) algorithm is employed to achieve the best (weighted) average [weight assigned based on deriving a figure-of-merit] of the several Base-Stations monitored. {Unlike CDMA telephones which control their local oscillator based on the signal from just 1 Base-Station}.

Monitoring a Base-Station involves acquiring and tracking the "Pilot Channel" that each Base-Station transmits. {Tracking is achieved by keeping a free-running counter, timed by the disciplined local oscillator, and having a modulus equal to the time-period of the (periodic) pilot code and identifying the (most likely) counter value corresponding to the arrival of the first chip of the 32,768-long pilot code. In my implementation the counter runs at 4*chip-rate so the closest counter value to the start of the 32,768-long chip sequence will have a precision of ($\frac{1}{4}$)-chip-time and I use a synthetic extension to make the precision ($\frac{1}{64}$)-chip-time}.

Example 2

This has to do with frequency planning. Let $f_c$ be the chip-rate (1.2288 MHz); $f_s$ is the sampling rate of the A/D converter; $f_0$ is the carrier frequency at RF; $f_L$ is the effective carrier frequency after down-conversion. $f_D$ is the effective carrier frequency after down-conversion and conversion to digital by the A/D converter. Then:

Choose $f_s=4 \cdot f_D$ {this has some very nice properties when I synthesize the I and Q (i.e. the In-phase and Quadrature signals)}

Choose $f_D \geq f_c$ {this preserves the double-sideband property, allowing us to use a single A/D converter and do the I/Q separation in the digital signal processing}

Choose $f_L=f_D+k \cdot f_s$ where k is an integer {This essentially describes the mode of aliasing. The center frequency $f_L$ automatically gets translated to $f_D$. The integer k is chosen such that the down-converted RF signal is within the conversion bandwidth of the A/D converter}

The following values were chosen: $f_D=f_c(=1.2288$ MHz); and set $f_s=4 \cdot f_c(=4.9152$ MHz); and $f_L=f_D+f_s(=6.144$ MHz) (I chose k=1). By making $f_L=6.144$ MHz (k=1) instead of $f_L=10.2288$ MHz (k=0) I found that designing the phase-locked-loops in the RF down-converter was a lot easier. In one embodiment, the A/D converter had a large conversion bandwidth (about 50 MHz) but a maximum sampling rate of 5 MHz and hence the choice of $f_s$. If in another embodiment, the A/D converter could support a higher sampling rate, say 24.576 MHz=4*6.144 MHz=20*1.2288 MHz, I could have chosen a different frequency plan: $f_s=24.576$ MHz; $f_D=f_L=6.144$ MHz (k=0). Generally speaking, the higher the sampling rate, the greater the accuracy in establishing the time-of-arrival of (the first chip of) the Pilot Code.

Example 3

The CDMA scheme uses an I-channel code and a Q-channel code that are different PN codes (PN==Pseudo Noise; to distinguish them from Pseudo Random Binary Sequences). The same data is modulated onto both codes and the I-channel signal and Q-channel signal modulated onto the In-phase and Quadrature versions of the RF carrier. Since the local oscillator in the receiver may have a phase offset from the RF carrier in the transmitter, the receiver needs to perform the I-code and Q-code correlations on both the In-phase and Quadrature components on the down-converted signal. This would need four correlators. Since the date is the same on both the I-channel and Q-channel codes the results from the four correlators can be combined in pairs to provide one (complex; i.e. with real-part and imaginary-part) correlation value. When I use the term "correlation value" I mean the magnitude-squared of this complex number, that is, the sum of the squares of the real and imaginary parts.

The In-phase and Quadrature components are synthesized from the single (real-valued digital signal from the A/D by multiplying by the cos( ) and sin( ) form of the effective carrier frequency which, after A/D conversion, is $f_D=0.25f_s$. {the inventive frequency plan ensures this relationship} Recognizing that the cos( ) and sin( ) forms both follow a pattern . . . +1, 0, −1, 0, +1, 0, −1, 0, . . . and further that when cos( ) is non-zero sin( ) is zero and vice-versa, I can combine the computation such that the four correlators collapse into two correlators, one which gives the real-part of the (eventual) correlation and one which gives the imaginary-part.

Example 4

With regard to tracking the pilot, conventional approaches use three code-generators and three correlators corresponding to "on-time", "early" and "late". The code generators are running continuously and generating the pilot code corresponding to "offset" of +($\frac{1}{2}$) chip, 0 chip, and −($\frac{1}{2}$) chip and thus the correlation with these three patterns is computed in a continuous fashion. After acquisition, and in the tracking mode, the "on-time" code generator (o chip offset) is essentially generating the code pattern in synchronism with the code pattern arriving at the receiver. The "early" and "late" correlations are computed to discern whether the local timebase is indeed locked to the timebase of the incoming signal and provides a control signal to adjust the local oscillator. Thus the local oscillator is "locked" to the pilot being tracked. The usual rule to generate the control signal is that if the "early" correlation value is larger than the "late" correlation value then the local oscillator is slowed down. The quality of lock is established by checking the ratio of the "early" (or "late") correlation to the "on-time" correlation (which should be the largest). Theoretically (actually ideally), with half-chip offsets, when I have synchronized the local oscillator to the pilot, the "early" correlation is equal to the "late" correlation and (should be approximately) equal to one-half the "on-time" correlation.

In the inventive implementation I can use a sampling frequency of 4*chip-rate and thus can adjust offsets to a granularity of ($\frac{1}{4}$)-chip-time (with a higher sampling frequency I could improve the granularity). I use one correlator in a sequential manner to compute the correlation values at 13 offsets corresponding to "on-time", ±($\frac{1}{4}$)-chip, ±($\frac{2}{4}$)-chip, ±($\frac{3}{4}$)-chip, ±($\frac{4}{4}$)-chip, ±($\frac{5}{4}$)-chip, ±($\frac{6}{4}$)-chip offsets. Whereas it would be nice to do these simultaneously, I can afford to do them sequentially because (a) these computations are not immediately used to control the local oscillator; and (b) the inventive local oscillator is stable enough that the consequence of not making the calculations simultaneously is not substantially adverse. Further, by monitoring the largest of these 13 correlations (I could get by 7, corresponding to 3 on either side of the "on-time", but 13 seems to work well. With a higher sampling frequency I would need more—the idea being to compute correlations somewhat beyond ±1-chip from "on-time") I can decide whether to change the notion of "on-time". I have to allow for this flexibility if I are monitor several pilots and discipline the local oscillator to an "average" implying that the local oscillator may not really be locked to the pilot in question.

Furthermore, by observing the pattern of correlations after "on-time" versus the correlations before "on-time" I can synthesize an offset (in one implementation this offset is between ±($\frac{1}{4}$)-chip with a granularity of ($\frac{1}{64}$)-chip) to improve the precision of the estimate of time-of-arrival of the received pilot code. The scheme for doing this adjustment is as follows. I Compute $P_E$ as the sum of 4 correlation values prior to "on-time" (offsets of −($\frac{1}{4}$)-, −($\frac{2}{4}$)-, −($\frac{3}{4}$)-, and −($\frac{4}{4}$)-chip offsets) and $P_L$ as the sum of 4 correlation values after "on-time". Nominally these should be equal which would be the case if the "on-time" was indeed aligned with the incoming code. Based on the ratio Of $P_E$ and $P_L$ I establish an "adjustment of between −($\frac{1}{8}$)-chip and +($\frac{1}{8}$)-chip. The actual algorithm implemented in the product is the following (assume $P_E$ is larger, indicating that the adjustment is negative; the roles of $P_E$ and $P_L$ will be reversed in the other case with the adjustment positive):

Let R be such that $R^{16} \approx 0.5$ {R is approximately 0.96}. Find k such that $P_E \cdot R^k \geq P_L \geq P_E \cdot R^{k+1}$ (I restrict values of k to between 0 and 15). The adjustment is then $(k/16)*(\frac{1}{8})$-chip in magnitude and negative, because the "early" term was larger than the "late" term. Thus if $P_E \geq 2 \cdot P_L$, then the adjustment is the maximum, namely, ($\frac{1}{8}$)-chip; if the two quantities are approximately equal then the adjustment is the minimum, namely zero.

Other adjustment schemes have been considered but this seems to work adequately. The simplest scheme involves just the smoothing the time-of-arrival quantity. I include this adjustment into the smoothing for some exceptionally good performance.

Example 5

In order to track the pilot, I need to first get an (albeit rough) estimate of the start of the received pilot code. One approach is the "brute-force" search where I choose an arbitrary starting point, measure the correlation value, decide if it is large enough then restart with a new starting point that is offset (by 1 chip, usually) from the former starting point. Eventually I will find the true starting point if indeed there was a pilot present. To speed up the acquisition process I developed the notion of an "Autonomous Background Correlator" (ABC) which just continually searches for potential start-of-pilot instants. To do this a correlator is used which correlates over N chips rather than M=32768 chips (the pilot period is 32768 chips) and N is an odd number (and hence relatively prime to M). For example, if N=32767 (which is a simple choice) then the ABC uses a code corresponding to the first 32767 chips of the pilot sequence. After completing one correlation cycle it starts the next one and since it is 1 chip shorter than the pilot code, it has the effect of introducing a precession of 1 chip. After 32768 correlation cycles it would have estimated the correlation values (albeit over 32767 chips rather than 32768 chips) for all 32768 possible starting points.

Since I am using the ABC solely for use as a first guess as to the starting point I can afford to make it a coarser version of the actual (length 32768-chip) correlator. For example N=4095 is quite appropriate (N must be large enough to get a reasonable correlation value and must be relatively prime to the full code length). Here the starting point guess does not follow the simple "process-by-one" pattern as was the case with N=32767, but after 32768 of these (shorter!) correlation cycles it would have cycled through all 32768 possibilities. Since the correlation period of 4095 chips is about (⅛) of the case where N=32767, the elapsed time taken to examine all possibilities is cut down by a factor of 8!

In the existing design I have included 3 ABCs which, when the search process starts (after reset) initialize their first choice in an evenly spread manner over the 32768 possible choices. The resulting performance in terms of time-to-first-acquisition is quite gratifying.

Example 6

When the receiver is first installed and powered up, it may not know which RF channel is being used by the CDMA Service provider. I provide an autonomous search process whereby each of the possible RF center frequencies is qualified as a "possible CDMA channel". The rationale is that a CDMA signal has a spectrum that is, ideally, flat across the frequency band. Nominally the frequency band occupied by the CDMA signal extends for (approximately) 600 kHz on either side of the carrier. Thus the bandwidth is roughly 1.2 MHz ("one-sided"; i.e. considering only positive frequencies). The inventive frequency plan can translate the RF carrier down from $f_0$ to $f_D$, preserving this 1.2 MHz one-sided bandwidth. By deriving a spectral flatness measure I can ascertain whether the received signal is "CDMA-like" (incidentally, pure white noise will look "CDMA-like"). I have used my Digital Signal Processing (DSP) device to establish the power content at 5 (narrow-band) frequencies corresponding to $f_D, f_D \pm \Delta f$ and $f_D \pm 2\Delta f$ where $\Delta f = (1/16) f_s \approx 300$ kHz. Thus I have 5 power values and if the ratio of the largest to the smallest is not very much greater than 1, then the spectrum is flat and the channel is "CDMA-like". To account for measurement noise and some non-stationarity behavior because of the (small) sample size, I have set the ratio as 4. That is, if the ratio is less than 4 then the channel is classified as "CDMA-like".

While dwelling on the same RF channel I compute the 5 powers as the average of several (as many as 8 or 16) "snapshots" to minimize the impact of measurement noise. Each "snapshot" comprises 10000 (consecutive) samples from the A/D converter. The 5 filters are implemented sequentially on the stored snap-shot. The classification scheme is enhanced by keeping the ABCs running while the snapshots and filter calculations are being done. After the filter calculations are done I look at the largest value of correlation seen over the duration. If this correlation value is large, then the channel is declared "CDMA-like" regardless of the power ratio.

Advantages of the Invention

A pilot tracking approach, representing an embodiment of the invention, can be cost effective and advantageous for at least the following reasons. The invention can improve pilot channel tracking accuracy. The invention can reduce the computational load in the design. In fact I achieve the same performance as the matched filter without the awesome computational burden on the matched filter and the technique is simple enough to incorporate in an off-the-shelf FPGA.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be assembled in the disclosed configuration, but could be assembled in virtually any configuration. Further, although the correlator circuit described herein can be a physically separate module, it will be manifest that the correlator circuit may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended subclaims.

REFERENCES

1) CDMA Systems Engineering Handbook, Jhong Sam Lee and Leonard E. Miller; Artech House Publishers (Boston, London) 1998.
2) CDMA: Principles of Spread Spectrum Communication, Andrew J. Viterbi, Addison-Wesley, 1995.
3) Mobile Station-Base Station Compatibility Standard for Dual-Mode Wideband Spread Spectrum Cellular System, TIA/EIA/IS-95-A, 1995.

What is claimed is:

1. A method for tracking a pilot channel signal to discipline an oscillator, comprising:

downconverting an RF signal from a RF center frequency $f_{RF}$ to an intermediate center frequency $f_L$ where $f_L$ is greater than or equal to a chip rate $f_c$ wherein downconverting includes incorporating bandpass filtering to remove extraneous signals while passing said pilot channel signal;

converting a signal format from analog to digital using a single analog-to-digital converter employing a sampling rate of $f_s$ to create a digital signal $\{s(n)\}$;

employing a correlation circuit to establish a correlation between $\{s(n)\}$ and locally generated versions of I-channel and Q-channel PN signals, $\{I_{PN}(n)\}$ and $\{Q_{PN}(n)\}$, respectively;

generating an estimate of a frequency error of the oscillator using correlation values corresponding to (2M+1) time shifts of $\{I_{PN}(n)\}$ and $\{Q_{PN}(n)\}$, the (2M+1) time shifts being $K-\Delta_M, K-\Delta_{(M-1)}, \ldots, K-\Delta_2, K-\Delta_1, K,$ and $K+\Delta_1, K+\Delta_2, \ldots, K+\Delta_{(M-1)}, K+\Delta_M$, where a time shift of K corresponds to a time shift that provides a maximum correlation value, and M is greater than or equal to 1; and disciplining the oscillator using the estimate of the frequency error of the oscillator, wherein correlation values between the digital signal $\{s(n)\}$ and at least one locally generated version of I-channel and Q-channel PN signals $\{I_{PN}(n)\}$ and $\{Q_{PN}$ (n)} are averaged over multiple periods of the PN signals to improve a quality of pilot position estimation.

2. The method of claim 1, wherein the sampling rate, $f_s$, the intermediate center frequency, $f_L$, and the chip rate $f_c$, are related by $f_s=4f_c$, and $f_L=f_c+kf_s$ for k=0.

3. The method of claim 1, wherein the sampling rate, $f_s$, the intermediate center frequency, $f_L$, and the chip rate $f_c$, are related by $f_s=4f_c$, and $f_L=f_c+kf_s$ for k=1.

4. The method of claim 1, wherein the sampling rate, $f_s$, the intermediate center frequency, $f_L$, and the chip rate $f_c$, are related by $f_s=4f_c$, and $f_L=f_c+kf_s$ for k=2.

5. The method of claim 1, wherein the correlation circuit uses a single accumulator for generating both an in-phase ("real") part and a quadrature ("imaginary") part of a complex correlation between the digital signal $\{s(n)\}$ and a given time shifted version of the locally generated versions of $\{I_{PN}(n)\}$ and $\{Q_{PN}(n)\}$.

6. The method of claim 5, wherein both positive overflows and negative underflows are monitored.

7. The method of claim 1, wherein a matched filter is not employed.

8. The method of claim 1, wherein correlations are computed at time shift lags which are commensurate with the sampling rate.

9. The method of claim 8, wherein correlations for lags smaller than the sampling interval are synthesized using a digital signal processing.

10. The method of claim 1, further comprising computing correlations over a period less than the time period of the PN signals using an autonomous background correlator.

11. The method of claim 1, wherein averaging includes averaging $C_{MS}$ over multiple correlation computations to reduce noise.

12. The method of claim 9, wherein using digital signal processing includes synthesizing an offset to improve precision of an estimate of time-of-arrival of a received pilot code.

13. The method of claim 1, further comprising employing another correlator circuit in parallel to track multiple pilots.

14. The method of claim 1, wherein the correlation circuit is time shared to track multiple pilots.

15. The method of claim 1, wherein the I-channel and Q-channel PN signals are different.

16. An apparatus to track a pilot signal to discipline an oscillator, comprising:
a correlator circuit adapted to compute a complex correlation between a received version of the pilot signal and locally generated versions of I-channel and Q-channel PN signals, $\{I_{PN}(n)\}$ and $\{Q_{PN}(n)\}$, respectively; and
a signal processor circuit coupled to the correlator circuit, wherein the signal processor circuit disciplines the oscillator and averages correlation values between the received version of the pilot signal and at least one locally generated version of I-channel and Q-channel PN signals $\{I_{PN}(n)\}$ and $\{Q_{PN}(n)\}$ over multiple periods of the PN signals to improve a quality of pilot position estimation.

17. The apparatus of claim 16, wherein said correlator circuit includes an FPGA.

18. The apparatus of claim 16, wherein the correlator circuit includes a single accumulator that computes both the real and imaginary part of the complex correlation.

19. The apparatus of claim 16, wherein said signal processor circuit includes a DSP.

20. A receiver including two of the apparatus according to claim 16 that are operated in parallel to track multiple pilots.

21. The receiver of claim 20, wherein at least one correlator computes correlation values over a time period of less than one period of the PN signals and is used as an autonomous background correlator.

22. The apparatus of claim 19, wherein the DSP synthesizes an offset to improve precision of an estimate of time-of-arrival of a received pilot code.

23. The apparatus of claim 16, wherein the correlator circuit is time shared to track multiple pilots.

24. The apparatus of claim 16, wherein the I-channel and Q-channel PN signals are different.

25. A method for tracking a pilot channel to discipline an oscillator, comprising:
downconverting the RF signal from the RF center frequency, $f_{RF}$ to an intermediate center frequency of $f_L$, where $f_L$ is greater than or equal to the chip rate, $f_c$, said downconversion incorporating bandpass filtering to remove extraneous signals while passing said pilot channel signal;
converting signal format from analog to digital using a single analog-to-digital converter employing a sampling rate of $f_s$, to create the digital signal $\{s(n)\}$;
employing correlation to establish the correlation between $\{s(n)\}$ and locally generated versions of I-channel and Q-channel PN signals, $\{I_{PN}(n)\}$ and $\{Q_{PN}(n)\}$, respectively;
generating an estimate of the frequency error of the oscillator using correlation values corresponding to (2M+1) time shifts of the locally generated versions of $\{I_{PN}(n)\}$ and $\{Q_{PN}(n)\}$, said time shifts being $K-\Delta_M$, $K-\Delta_{(M-1)}, \ldots, K-\Delta_2, K-\Delta_1, K,$ and $K+\Delta_1, K+\Delta_2, \ldots, K+\Delta_{(M-1)}, K+\Delta_M$, where time shift of K corresponds to the time shift that provides a maximum correlation value, and the value of M is 4; and
disciplining the oscillator using the estimate of the frequency error of the oscillator,
wherein correlation values between the digital signal $\{s(n)\}$ and at least one locally generated version of I-channel and Q-channel PN signals $\{I_{PN}(n)\}$ and $\{Q_{PN}(n)\}$ are averaged over multiple periods of the PN signals to improve a quality of pilot position estimation.

26. A method of tracking a pilot channel to discipline an oscillator, comprising:
disciplining an oscillator including generating a spectrum shaped channel pilot signal $\{\gamma(n)\}$ from a chip-rate PN sequence $\{i(n)\}$ by:
oversampling the chip-rate PN sequence $\{i(n)\}$ at a higher sampling rate to yield a signal $\{a(n)\}$;
passing $\{a(n)\}$ through a first FIR filter whose impulse response coefficients are $\{g(n)\}$ to yield a signal $\{ϑ(n)\}$; and
filtering $\{ϑ(n)\}$ with a second FIR filter to yield the spectrum shaped channel pilot signal $\{\gamma(n)\}$; and
averaging correlation values between the signal $\{a(n)\}$ and the spectrum shaped channel pilot signal $\{\gamma(n)\}$ over multiple periods of the chip-rate PN sequence to improve a quality of pilot position estimation.

27. The method of claim 26, wherein the spectrum shaped channel pilot signal $\{\gamma(n)\}$ is a spectrum shaped I-channel pilot signal.

28. The method of claim 26, wherein both positive overflows and negative overflows are monitored.

29. The method of claim 26, further comprising translating the spectrum shaped I channel pilot signal $\{\gamma(n)\}$ down to a zero-offset-carrier frequency signal $\{s(n)\}$.

30. The method of claim 29, further comprising translating the zero-offset-carrier frequency signal {s(n)} down to a baseband signal {w(n)}.

31. The method of claim 26, wherein a sampling clock is derived from a VCXO that is phase-locked to a reference frequency.

32. The method of claim 26, wherein a correlation is computed at lags which are commensurate with a sampling rate.

33. The method of claim 26, wherein a matched filter is not employed.

34. The method of claim 26, wherein the spectrum shaped channel pilot signal {γ(n)} is a spectrum shaped Q-channel pilot signal.

35. The method of claim 26, wherein averaging includes averaging $C_{MS}$ over multiple correlation computations to reduce noise.

36. The method of claim 26, wherein correlations for lags smaller than the sampling interval are synthesized using digital signal processing.

37. The method of claim 36, wherein using digital signal processing includes synthesizing an offset to improve precision of an estimate of time-of-arrival of a received pilot code.

38. The method of claim 26, further comprising disciplining another oscillator in parallel to track multiple pilots including generating another spectrum shaped channel pilot signal by:
    oversampling to yield another signal;
    passing the another signal through another FIR filter; and
    filtering with another second FIR filter to yield the another spectrum shaped channel pilot signal.

39. The method of claim 26, further comprising time sharing a correlator circuit to track multiple pilots.

40. The method of claim 26, wherein disciplining an oscillator includes generating another spectrum shaped channel pilot signal from another different chip-rate PN sequence.

41. An apparatus to track a pilot signal to discipline an oscillator, comprising:
    a correlator circuit adapted to oversample a chip-rate PN sequence {i(n)} at a higher sampling rate to yield a signal {a(n)}, pass {a(n)} through a first FIR filter whose impulse response coefficients are {g(n)} to yield a signal {ϑ(n)}; and filter {ϑ(n)} with a second FIR filter to yield a spectrum shaped pilot channel signal {γ(n)}; and
    a signal processor circuit coupled to the correlator circuit, wherein the signal processor circuit disciplines the oscillator and averages correlation values between the signal {a(n)} and the spectrum shaped channel pilot signal {γ(n)} over multiple periods of the chip-rate PN sequence to improve a quality of pilot position estimation.

42. The apparatus of claim 41, wherein said correlator circuit includes a FPGA.

43. The apparatus of claim 41, wherein said signal processor circuit includes a DSP.

44. The apparatus of claim 41, further comprising an A/D converter coupled to said signal processor circuit.

45. The apparatus of claim 41, wherein the first FIR filter includes a 4-point FIR filter having all 4 coefficients at least substantially equal.

46. The apparatus of claim 41, wherein the second FIR filter includes a 48-point FIR filter.

47. The apparatus of claim 41, further comprising an autonomous background correlator coupled to the correlator circuit.

48. A receiver comprising at least two of the apparatus according to claim 41 that are operated in parallel to track multiple pilots.

49. The apparatus of claim 16, wherein the signal processor averages $C_{MS}$ over multiple correlation computations to reduce noise.

50. The apparatus of claim 41, wherein the signal processor averages $C_{MS}$ over multiple correlation computations to reduce noise.

51. The apparatus of claim 41, wherein the DSP synthesizes an offset to improve precision of an estimate of time-of-arrival of a received pilot code.

52. The apparatus of claim 41, wherein the correlator circuit is time shared to track multiple pilots.

53. The apparatus of claim 41, wherein the correlator circuit adapted to oversample another different chip-rate PN sequence.

* * * * *